US007120252B1

(12) United States Patent
Jones et al.

(10) Patent No.: US 7,120,252 B1
(45) Date of Patent: *Oct. 10, 2006

(54) SYSTEM AND METHOD FOR AUTOMATICALLY PROTECTING PRIVATE VIDEO CONTENT USING CRYPTOGRAPHIC SECURITY FOR LEGACY SYSTEMS

(75) Inventors: William L. Jones, Portland, OR (US); Walter J. Schon, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 09/931,794

(22) Filed: Aug. 16, 2001

(51) Int. Cl.
*H04N 7/167* (2006.01)

(52) U.S. Cl. ............... 380/201; 380/203; 380/210; 380/229

(58) Field of Classification Search .......... 380/201, 380/203, 229, 210
See application file for complete search history.

(56) References Cited

U.S. PATENT DOCUMENTS

| | | | | |
|---|---|---|---|---|
| 5,499,294 | A | * | 3/1996 | Friedman ............... 713/179 |
| 5,621,579 | A | * | 4/1997 | Yuen ................... 386/121 |
| 5,623,637 | A | * | 4/1997 | Jones et al. ............. 711/164 |
| 5,799,083 | A | | 8/1998 | Brothers et al. ............ 380/20 |
| 5,912,972 | A | | 6/1999 | Barton .................. 380/23 |
| 5,974,141 | A | * | 10/1999 | Saito ................... 705/52 |
| 6,178,242 | B1 | | 1/2001 | Tsuria .................. 380/201 |
| 6,587,949 | B1 | * | 7/2003 | Steinberg ............... 713/193 |
| 6,694,023 | B1 | * | 2/2004 | Kim .................... 380/203 |
| 6,731,756 | B1 | * | 5/2004 | Pizano et al. ............. 380/201 |
| 2001/0009580 | A1 | * | 7/2001 | Ikeda .................. 380/201 |
| 2002/0112168 | A1 | | 8/2002 | Filipi-Martin et al. ...... 713/183 |
| 2003/0120604 | A1 | * | 6/2003 | Yokota et al. ............. 705/57 |

FOREIGN PATENT DOCUMENTS

EP 1096714 A * 2/2001

OTHER PUBLICATIONS

Orfali et al., "Client/Server Survival Guide," 3rd Ed. (1999), Ch. 7, Wiley & Sons, USA.
Copy of Office Action Summary from U.S. Appl. No. 09/931,803 which was mailed on Apr. 7, 2005.
An Introduction to Cryptography, http://www.pgpi.org/doc/guide/6.5/en/intro/.
Copy of Office Action from U.S. Appl. No. 09/931,803 mailed Sep. 20, 2005.
Orfali et al., "Client/Server Survival Guide," 3rd Ed. (1999), Ch. 7, Wiley & Sons, USA.
Copy of Office Action Summary from U.S. Appl. No. 09/931,803 which was mailed on Jan. 31, 2006.

* cited by examiner

*Primary Examiner*—Emmanuel L. Moise
*Assistant Examiner*—Kevin Schubert
(74) *Attorney, Agent, or Firm*—Zilka-Kotab, PC; Christopher J. Hamaty

(57) ABSTRACT

A system and method for automatically protecting private video content using cryptographic security for legacy systems is disclosed. A substantially continuous video signal representing video content in the process of being recorded on a transportable storage medium is intercepted. The intercepted substantially continuous video signal is divided into individual frames. Each frame stores a fixed amount of data in digital form. Each individual frame is encrypted into encrypted video content using an encryption cryptographic key and is stored. The encrypted frames are retrieved and decrypted using a decryption cryptographic key. The decrypted frames are combined into a substantially continuous video signal and output as video content in the process of being played from the transportable storage medium. In a further embodiment, private video content automatically authenticated using embedded cryptographic security, either alone or in conjunction with the encryption of video content.

43 Claims, 15 Drawing Sheets

90

160

170

SYSTEM AND METHOD FOR AUTOMATICALLY PROTECTING PRIVATE VIDEO CONTENT USING CRYPTOGRAPHIC SECURITY FOR LEGACY SYSTEMS

FIELD OF THE INVENTION

The present invention relates in general to private video content security and, in particular, to a system and method for automatically protecting private video content using cryptographic security for legacy systems.

BACKGROUND OF THE INVENTION

Digital video cameras have become increasingly popular and are commonly used by professionals and consumers alike to produce videotaped movies or, simply "videos." Digital video cameras differ from conventional movie cameras by storing information on cartridges of electronic tape, rather than on photographic film reels. Images are converted and stored as a continuous electronic signal streamed onto videotapes for storage, editing and viewing.

The number and types of users of video camera technology has continued to grow for several reasons. Recording videos in digital form originally required significant amounts of storage capacity. However, recent advances in providing increased storage capacity at lower costs have made digital video camera technology available to a wider user base. Further, videos are more flexible than film and can be exchanged electronically, including over digital data transmission means, such as the Internet. Finally, de facto standardized video formats allow device-independent playback, even using commonly available Web-browsers.

The availability of standardized data formats and the ease of dissemination can facilitate the creation and distribution of illicit copies. Conventional digital video cameras, including recorders and players, lack fundamental security measures to protect against the unauthorized use and compromise of private video content and to provide trustworthy authentication of authorship. Several recent examples of video compromise and theft underscore the need for effective security for private video content. In one notorious case, a private video taken of a celebrity couple was stolen and posted on the Internet, resulting in embarrassment and harm to their reputations. In other instances, stolen video content has been reproduced and sold without authorization, thereby resulting in lost profits.

Similarly, digital video content can be easily fabricated or altered. Conventional digital video cameras, including recorders and players, likewise lack means for authenticating the identity of the author. Authentication is particularly important in such fields as law enforcement where the veracity of data and identity of authorship play critical roles.

In the prior art, copy guard protections have long been used to protect commercially produced videos. However, only rudimentary security measures using basic password protection exist for protecting private video content. Typically, a password is applied to the recorded digital data file and playback is disabled, absent the correct entry of the password. This form of password protection, though, protects the media as a whole and not the individual parts or frames. Moreover, the password is generally applied after recording is complete and not as part of the recording or playback processes. Thus, the video content is at risk of compromise until the password is secured. For these reasons, password security offers only marginal protection and is easily compromised.

As well, videotape equipment, including cameras, players, and the like, have been commercially available for years. Except as described above, these devices generally lack security features and the necessary expansion capabilities to introduce aftermarket accessories to provide such security. Consequently, video content generated and played by these "legacy" devices remains unprotected and subject to compromise.

Therefore, there is a need for an approach to provide security and authentication to private legacy digital video production equipment to protect content during playback and to authenticate an author. Preferably, such an approach would incorporate device-independent security transparently employed during both recordation and playback processes using a cryptographic security scheme.

There is a further need for an approach to providing security and authentication incorporated into legacy digital video media. Preferably, such an approach would selectively provide on-the-fly symmetric or asymmetric (or both) key encryption and decryption and would further provide trustworthy authentication of recorded data as an integral part of the data recordation and playback processes.

SUMMARY OF THE INVENTION

The present invention provides a system and method for protecting private video content by introducing a device-independent cryptographic scheme transparently introduced during the recordation and playback processes. A raw continuous signal is intercepted prior to recordation on a storage medium, such as a videotape. Individual frames are extracted from the intercepted continuous signal. Each frame is encrypted using an encryption cryptographic key prior to actual storage on the storage medium. Upon playback, a decryption cryptographic key is preferably first credentialed, then used to decrypt the encrypted frames as each frame is retrieved from the videotape. The decrypted frames are reassembled into a reconstructed video signal for playback. The encryption and decryption cryptographic keys are preferably asymmetric public and private keys, respectively, but could also be symmetric cryptographic keys.

The invention also provides private video content automatically authenticated using embedded cryptographic security, either alone or in conjunction with the encryption of video content. For security reasons, only frames that are "signed" can be verified for authorship. Multiple frames could be signed with a single signature to enhance performance, but each frame is preferably signed individually.

An embodiment of the present invention is a system and a method for automatically protecting private video content using cryptographic security for legacy systems. A substantially continuous video signal representing video content in the process of being recorded on a transportable storage medium is intercepted. The intercepted substantially continuous video signal is divided into individual frames. Each frame stores a fixed amount of data in digital form. Each individual frame is encrypted into encrypted video content using an encryption cryptographic key and is stored. The encrypted frames are retrieved and decrypted using a decryption cryptographic key. The decrypted frames are combined into a substantially continuous video signal and output as video content in the process of being played from the transportable storage medium.

A further embodiment is a system and method for encrypting private video content using cryptographic security for legacy systems. A substantially continuous video signal is intercepted prior to recordation on a transportable storage medium. The substantially continuous video signal represents raw video content. The substantially continuous video signal is divided into individual frames which each store a fixed amount of data in digital form. Each individual frame is encrypted into encrypted video content using an encryption key selected from a cryptographic key pair. The encrypted frames are stored on the transportable storage medium for retrieval and decryption using a decryption key selected from the cryptographic key pair.

A further embodiment is a system and method for decrypting private video content using cryptographic security for legacy systems. Encrypted frames are retrieved prior to playback from a transportable storage medium. The encrypted frames store raw video content encrypted using an encryption cryptographic key selected from a cryptographic key pair. Each encrypted frame is decrypted using a decryption cryptographic key selected from the cryptographic key pair. The decrypted frames are combined into a substantially continuous video signal representing the raw video content in reconstructed form.

A further embodiment is a system and method for automatically authenticating private video content using cryptographic security for legacy systems. A substantially continuous video signal representing video content is intercepted in the process of being recorded on a transportable storage medium. A substantially continuous video signal representing raw video content is divided into individual frames. Each frame stores a fixed amount of data in digital form. A fixed-length original cryptographic hash is generated from at least one such individual frame. The original cryptographic hash is encrypted using an encryption cryptographic key. The encrypted original cryptographic hash is stored as a digital signature on a transportable storage medium. The digital signature is retrieved from the transportable storage medium. The encrypted original cryptographic hash is decrypted using a decryption cryptographic key. A verification fixed-length cryptographic hash is generated from at least one such individual frame. The verification cryptographic hash and the original cryptographic hash are compared. The individual frames are combined into a substantially continuous video signal. The substantially continuous video signal is output as video content in the process of being played from the transportable storage medium upon successful comparison of the verification cryptographic hash and the original cryptographic hash.

A further embodiment is a system and method for digitally signing private video content using cryptographic security for legacy systems. A substantially continuous video signal is intercepted prior to recordation on a transportable storage medium. The signal represents raw video content. The signal is divided into individual frames. Each frame stores a fixed amount of data in digital form. A fixed-length original cryptographic hash is generated from at least one such individual frame. The original cryptographic hash is encrypted using an encryption cryptographic key from a cryptographic key pair. The encrypted original cryptographic hash is stored as a digital signature on a transportable storage medium for retrieval and decryption using a decryption key selected from the cryptographic key pair.

A further embodiment is a system and method for verifying digitally signed private video content using cryptographic security for legacy systems. Frames are retrieved prior to playback from a transportable storage medium. The frames store raw video content and include a digital signature encrypted using an encryption cryptographic key selected from a cryptographic key pair. A verification fixed-length cryptographic hash is generated from at least one such individual frame. The verification cryptographic hash and the original cryptographic hash are compared. The individual frames are combined into a substantially continuous video signal. The substantially continuous video signal is output as video content in the process of being played from the transportable storage medium upon successful comparison of the verification cryptographic hash and the original cryptographic hash.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
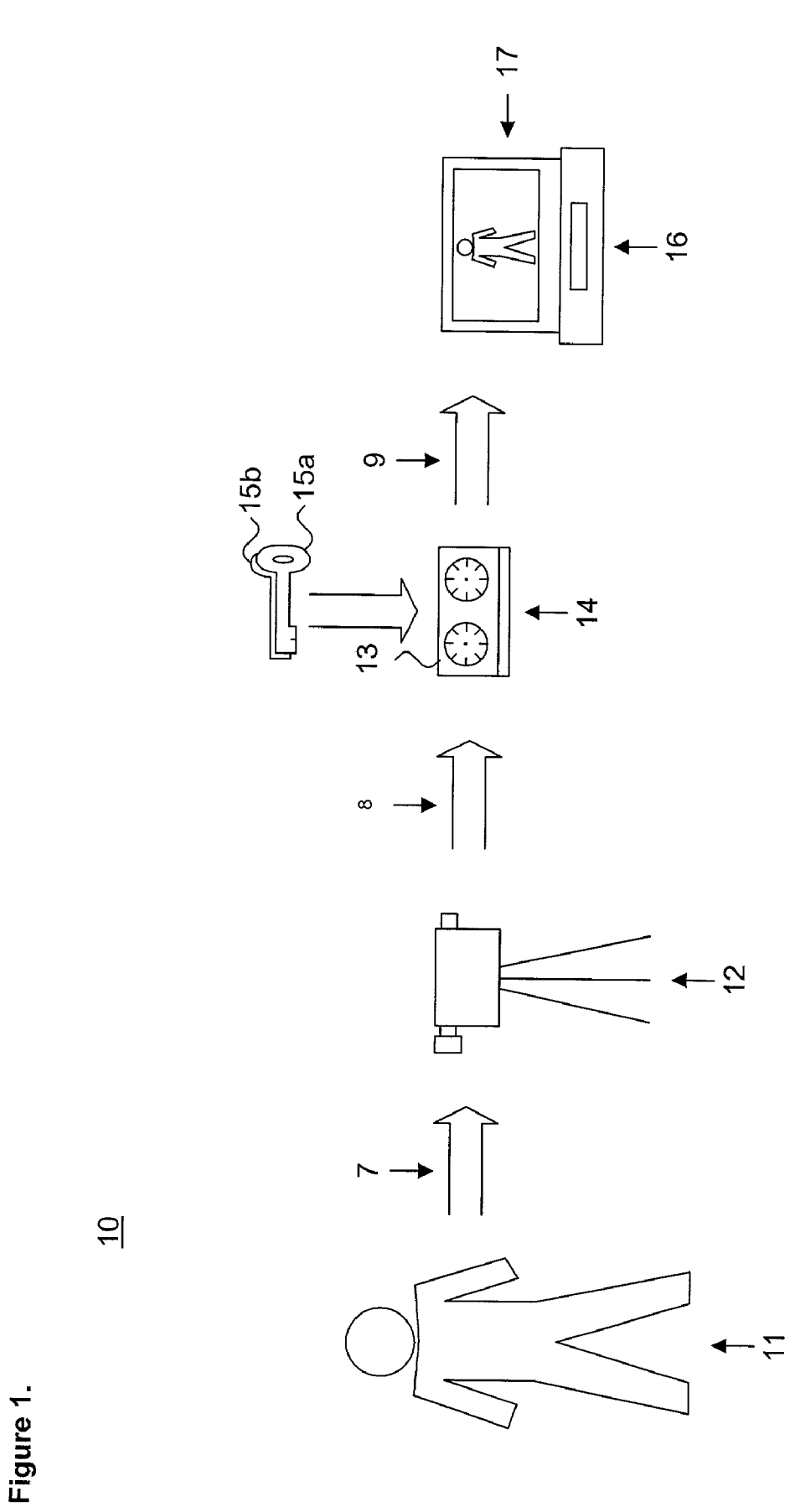
FIG. 1 is a block diagram showing a system for automatically protecting and authenticating video content using cryptographic security for legacy systems, in accordance with the present invention.

FIG. 1 is a block diagram showing a system for automatically protecting and authenticating video content using cryptographic security for legacy systems 10, in accordance with the present invention. Video content 11 is produced using a video camera 12 to record (transition 7) moving images and sound. Generally, the video content 11 is private video content recorded as original content and not as mass produced video content intended for commercial distribution. The video camera 12 translates the light and sound from a moving image into a substantially continuous, preferably digitized, signal that is recorded electronically on a transportable storage medium, such as a videotape. The videotape can be viewed using a video player 16 which generates a reconstructed substantially continuous signal for display on a television, monitor or similar viewing screen 17.

The video camera 12, videotape, and video player 16 are conventional devices as known in the art, but the videotape is augmented with embedded cryptographic security features as described herein. As well, the video camera 12 could be any form of video recording device, including a video cassette recorder (VCR), and the video player 16 could be any form of video playback device, including a video camera or personal computer system. Alternatively, the video camera 12 and video player 16 could themselves be crypto-enabled to provide embedded cryptographic security, such as described in the related commonly-assigned U.S. patent application Ser. No. 09/931,803, filed Aug. 16, 2001, pending, the disclosure of which is incorporated by reference.

When recorded (transition 8) using a crypto-embedded videotape 14, as further described below with reference to FIG. 4, video content 11 recorded by the video camera 12 is automatically protected using cryptographic security for legacy systems. An encryption cryptographic key 15$a$ is used to encrypt the video content 11 while being recorded onto the crypto-embedded videotape 14. Cryptographic operating logic built into the crypto-embedded videotape intercepts the continuous signal and stores the video content as encrypted data. Thus, the video content is protected against compromise and unauthorized disclosure by virtue of being stored in an encrypted form.

Playback of the encrypted video content 13 requires decryption using the same cryptographic operating logic. A decryption cryptographic key 15$b$ is used to decrypt the encrypted video content 13 during playback. The encrypted video content 13 is intercepted prior to being sent (transition 9) as a reconstructed continuous signal to the video player 16.

In the described embodiment, an asymmetric, or public key, encryption scheme is preferred, using a public key and private key. Three commonly known public key encryption schemes are the RSA, TwoFish and Diffie-Hellman encryption.

Alternatively, a symmetric cryptographic scheme could also be used, using the same cryptographic key for encryption and decryption. Asymmetric and symmetric cryptographic schemes are described in R. Orfali, "Client/Server Survival Guide, 3$^{rd}$ Edition," Ch. 7, John Wiley & Sons, Inc. (1999), the disclosure of which is incorporated by reference. An exemplary public key cryptographic system suitable for use in the present invention is the PGP Desktop Security product, licensed by Networks Associates Technology, Inc., Santa Clara, Calif.

The crypto-embedded videotape preferably further includes means for credentialing a user attempting to decrypt encrypted video content 13 retrieved from the videotape using a decryption key 15$b$0. For example, public key cryptographic schemes generally require the entry of a pass-phrase or password to validate the identity of a user attempting to decrypt encrypted content using a corresponding private key. The credentialing means could be by way of a keyboard or similar input device.

In a further embodiment, the video content 13 is automatically authenticated using the cryptographic security for legacy systems. The cryptographic key 15$a$ is used during the recordation process by the crypto-embedded videotape to automatically digitally sign the video content 13 prior to storage (transition 8) onto the videotape, as further described below in FIG. 9. Similarly, the cryptographic key 15$b$ is used during the playback process by the crypto-embedded videotape to automatically verify the digitally signed video content 13 following retrieval (transition 9), as further described below with reference to FIG. 10. To perform automatic authentication, a private key is used as the encryption key and a public key is used as the decryption key. Automatic authentication can be performed in combination with automatic protection to ensure that the video content 13 is protected and the proper identity of the author ensured, as further described below with reference to FIGS. 14 and 15.

Figure 2:
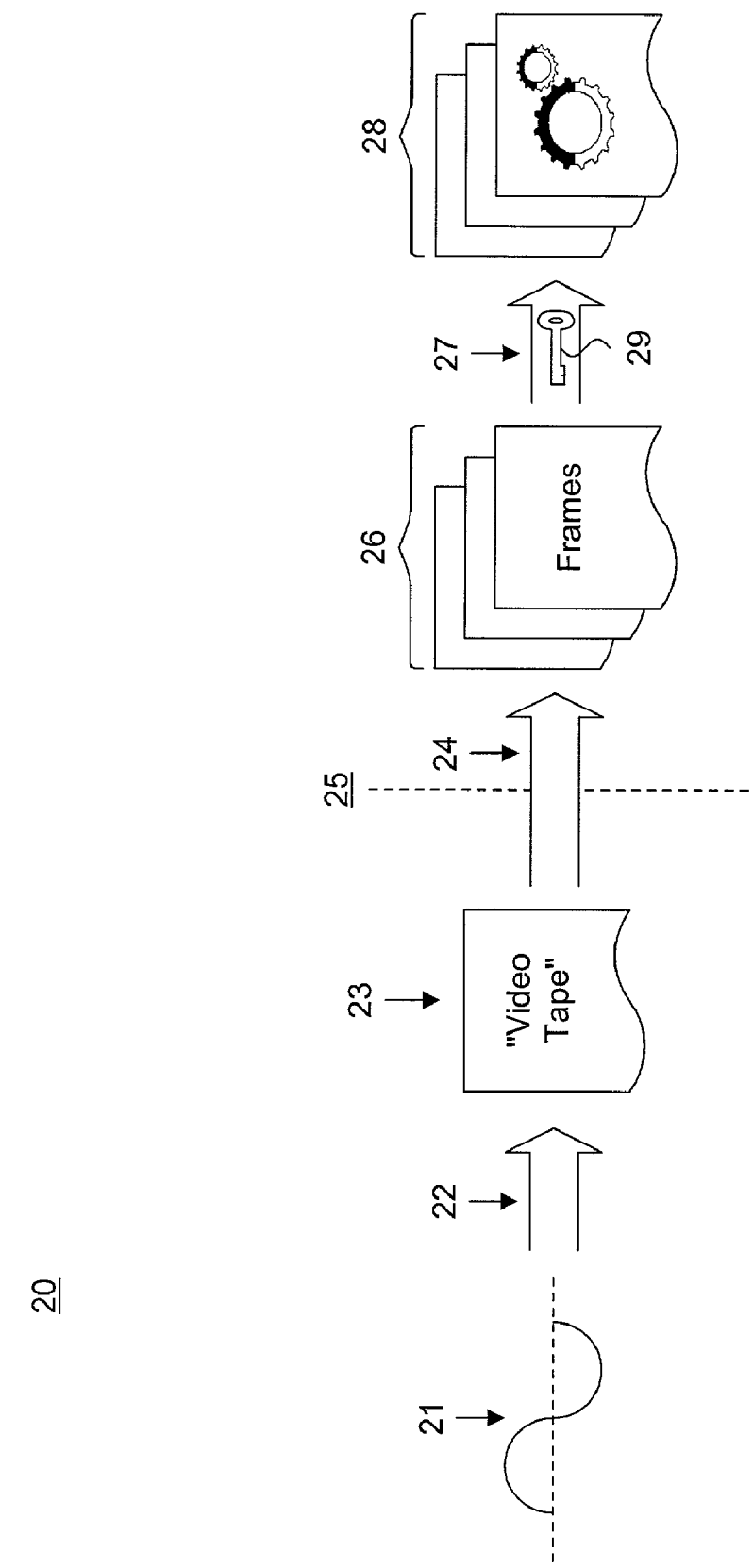
FIG. 2 is a process flow diagram showing the encryption of the video content using the crypto-embedded videotape of FIG. 1.

FIG. 2 is a process flow diagram 20 showing the encryption of video content 11 using the crypto-embedded videotape 14 of FIG. 1. The video content 11 is represented by a substantially continuous signal 21 that is "stored" (transition 22) by the video camera 12 onto a "videotape" 23 (shown in FIG. 1) as an electronic representation of the images and sounds being recorded. The cryptographic operating logic incorporated into the crypto-embedded videotape 14 creates the illusion of a physical "videotape" 23 from the perspective of the video camera 12 and video player 16 (shown in FIG. 1). Internally, however, the continuous signal 21 is divided into discrete frames of information (transition 24) having a fixed size. Each frame is encrypted (transition 27) using an encryption key 29, as further described below with reference to FIG. 7, to generate encrypted frames 28. The encrypted frames 28 are actually physically recorded onto the crypto-embedded videotape 14. Note only raw video content passes the physical boundary 25 separating the video camera 12 from the crypto-embedded videotape 14.

Figure 3:
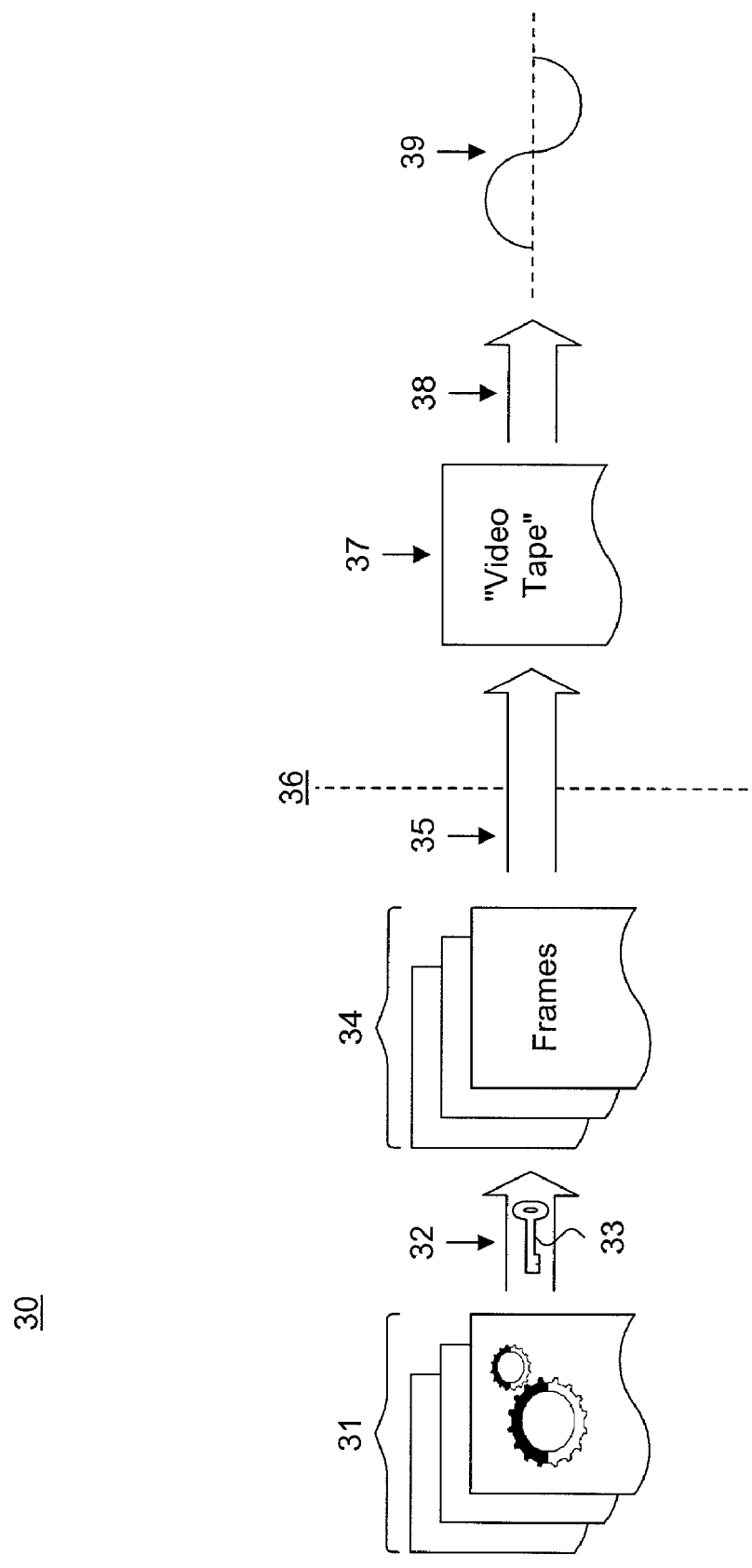
FIG. 3 is a process flow diagram showing the decryption of encrypted video content using the crypto-embedded videotape of FIG. 1.

FIG. 3 is a process flow diagram 30 showing the decryption of encrypted video content 13 using a crypto-embedded videotape 14 of FIG. 1. Encrypted video content 13 is read from a crypto-embedded videotape 14 by the video player 16 (shown in FIG. 1). The encrypted video content 13 is retrieved as a sequence of encrypted frames 31 stored by the cryptographic operating logic in the crypto-embedded videotape 14 during the encryption process 20 of FIG. 2. Each encrypted frame 31 is decrypted (transition 32) using a decryption key 33, as further described below with reference to FIG. 8. The decryption key is first credentialed using a pass-phrase or password (not shown) prior to decrypting the encrypted frames 31. The decrypted frames 34 are reassembled (transition 35) into a "videotape" 37 for viewing, processing or storage (transition 38) as a continuous signal 39. Note only raw video content passes the physical boundary 36 separating the crypto-embedded videotape 14 from the video player 16.

The videotape 14 includes cryptographic operating logic as further described below beginning with reference to FIG. 4. In the described embodiment, the operating logic is implemented as part of an embedded system built into each crypto-embedded videotape 14. However, the processing logic could also be implemented in programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

In addition, each process flow 20 and 30 can be implemented as a computer program, procedure or module written as source code in a conventional programming language, such as the Java or Visual Basic programming languages, and can be presented for execution to a processor as object or byte code, as is known in the art. The various implementations of the source code and object and byte codes can be held on a computer-readable storage medium or embodied on a transmission medium in a carrier wave.

Figure 4:
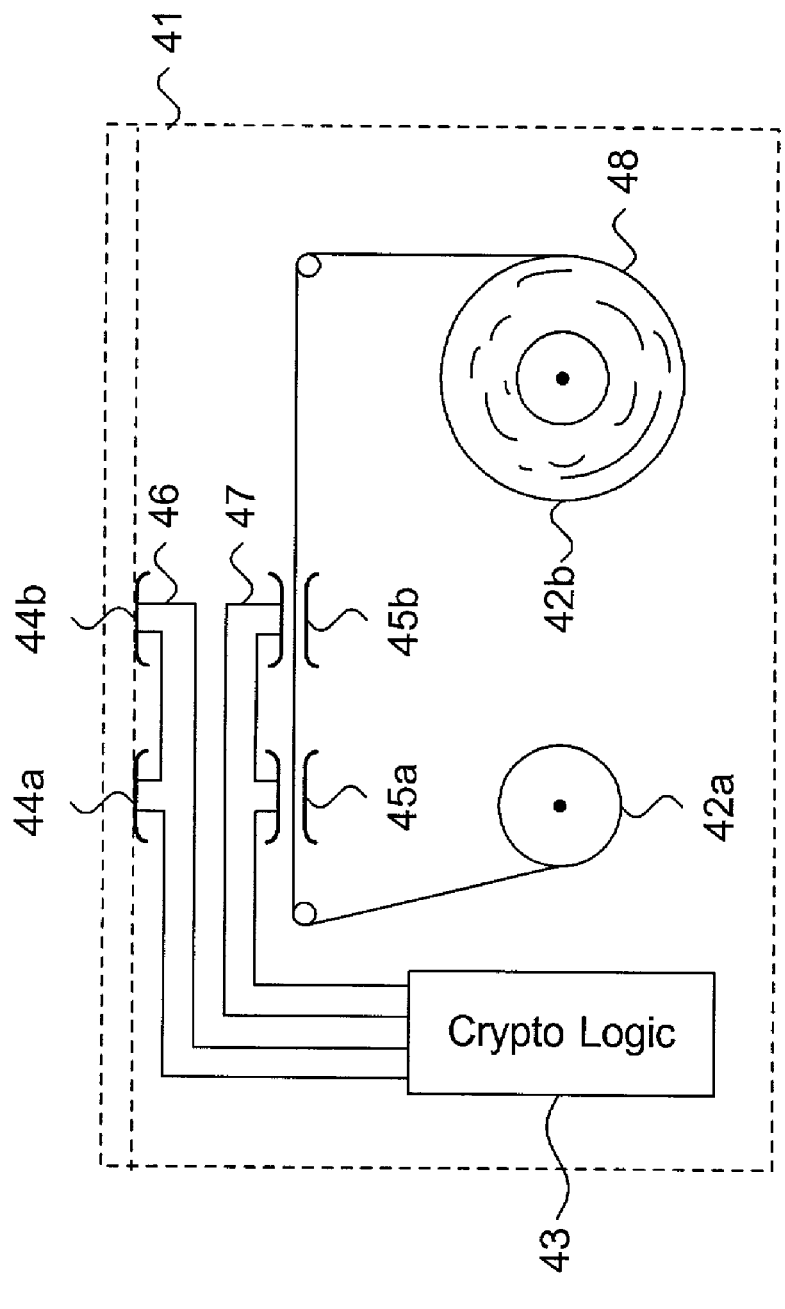
FIG. 4 is a block diagram showing the components of the crypto-embedded videotape of FIG. 1.

FIG. 4 is a block diagram showing the components 40 of the crypto-embedded videotape 14 of FIG. 1. For clarity of presentation, only the components pertinent with reference to the encryption process 20 and decryption process 30 (shown in FIGS. 2 and 3, respectively) are described, as the remaining electromechanical functions would be readily known to one skilled in the art. In addition, sound recordation and reproduction components have been omitted, as the processing of sound data is analogous to image data and would be handled in a substantially identical manner.

The crypto-embedded videotape 14 consists of a standard videotape housing 41 modified to include cryptographic operating logic ("crypto logic") 43, as further described below with reference to FIG. 5. The crypto logic 43 intercepts the data being electronically recorded to or played back from the crypto-embedded videotape 14. As is standard in the art, the crypto-embedded videotape 14 includes a pair of take-up reels 42*a*–*b* for storing videotape 48. During recording, the crypto logic 43 intercepts the continuous signal received from the videotape transport mechanism of the video camera 12, video player 16 or similar device, via a read head 44*a* interconnected to the crypto logic via a bus 46. The read head 44*a* simulates a pseudo "videotape" by receiving the recording signal sent from the recording head of the video camera 12, video player 16 or similar device. The intercepted continuous signal is encrypted and recorded as encrypted frames onto the videotape 48 via a write head 45*b* interconnected to the crypto logic via a bus 47.

During playback, the encrypted frames stored on the videotape 48 are read via a read head 45*a*, also interconnected to the crypto logic via the bus 47 and decrypted by the crypto logic 43. The decrypted frames are then reassembled into the continuous signal and sent to the videotape transport mechanism of the video camera 12, video player 16 or similar device, via a write head 44*b*, also interconnected to the crypto logic via the bus 46. The write head 44*b* simulates the pseudo "videotape" by generating a playback signal sent to the read head of the video camera 12, video player 16 or similar device.

In a further embodiment, the stored video content is automatically authenticated using a digital signature. The digital signature is generated from at least one selected frame. Note only signed frames can be verified for authenticity of author. Upon recordation, a cryptographic hash is generated from the frame using a one-way hashing function and encrypted preferably using a private key. Upon playback, the cryptographic hash is retrieved and decrypted. A second cryptographic hash is generated from the selected frame and compared to the decrypted cryptographic hash. The video content is output if the two cryptographic hashes match.

Figure 5:
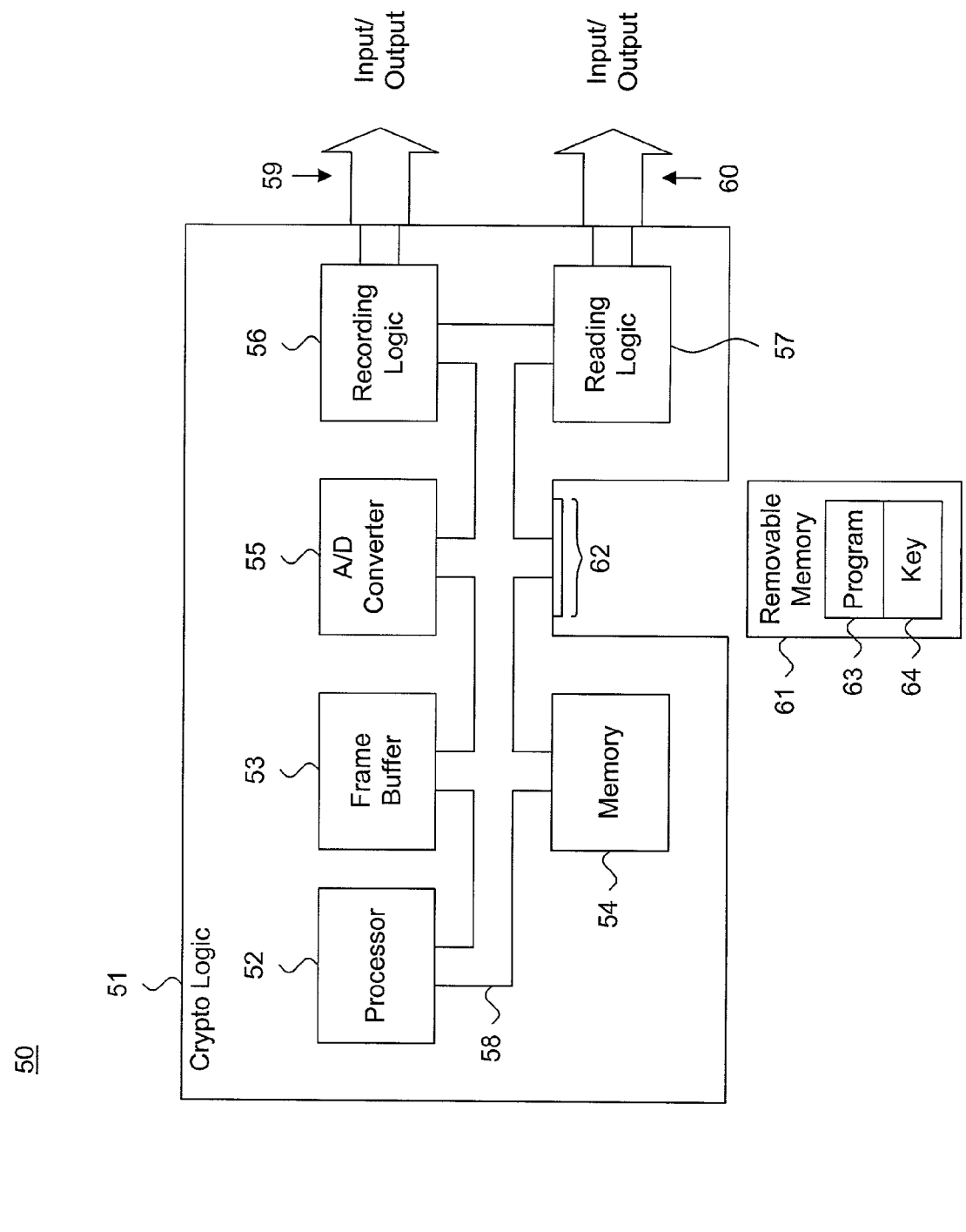
FIG. 5 is a block diagram showing the modules of the cryptographic operating logic of FIG. 4.

FIG. 5 is a block diagram 50 showing the modules 51 of the crypto logic 43 of FIG. 4. The continuous signal is fed into crypto logic 43 for conversion from video content 11 to and from encrypted video content 13 (shown in FIG. 1). The crypto logic 43 includes six components interconnected via a bus 58: processor 52, frame buffer 53, memory 54, analog-to-digital (A/D) converter 55, recording logic 56, reading logic 57, and removable memory 61. The memory 54 stores both operational program logic and transient data. The processor 52 executes instructions stored in the memory 54 to control the recordation, processing and transformation of the continuous signal 21 of FIG. 2 into and from encrypted video content 13. The frame buffer 53 converts the continuous signal 21 into and from individual frames 26. The recording logic 56 interfaces via the buses 46 and 47 to the videotape recordation heads 44*b* and 45*b* (shown in FIG. 4) via a connector port 59. Similarly, the reading logic 57 interfaces to the read heads 44*a* and 45*a* via the buses 46 and 47 via a connector port 60.

The removable memory 61 preferably includes a program 63 and encryption and/or decryption cryptographic keys 64. The program 63 includes instructions for encrypting the frames 26 of FIG. 2, using the encryption key 64 and/or decryption keys for decrypting encrypted frames 31 (shown in FIG. 3). In the described embodiment, the removable memory 61 operatively couples to a standardized connector 62, thereby enabling multiple encryption and/or decryption keys 64 to be used in conjunction with the crypto-embedded videotape 14. The processor 52 (shown in FIG. 5) executes the program 63 to encrypt the frames 26 into encrypted frames 28 of FIG. 2 which are then physically stored on the videotape, or the processor 52 executes program 63 to decrypt encrypted frames 31 into frames 34 which are then played back on write head 44*b* via bus 46 via connector port 59.

In a further embodiment, the program 63 includes instructions for digitally signing the stored video content using a digital signature, as further described below with reference to FIG. 12. The processor 52 executes the program 63 to generate a cryptographic hash of a selected frame. The hash is then encrypted using the encryption key 64 to generate a digital signature that is then physically stored on the videotape.

In a further embodiment, the program 63 also includes instructions for verifying digitally signed video content using a decryption key 64, as further described below with reference to FIG. 13. Digitally signed video content is retrieved from the videotape 48. The processor 52 executes the program 63 to decrypt a cryptographic hash of the selected frame using the decryption key 64. A hash of a selected unverified frame is generated and compared to the decrypted hash. Matching hashes verify the veracity of the data and the identity of the author.

Figure 6:
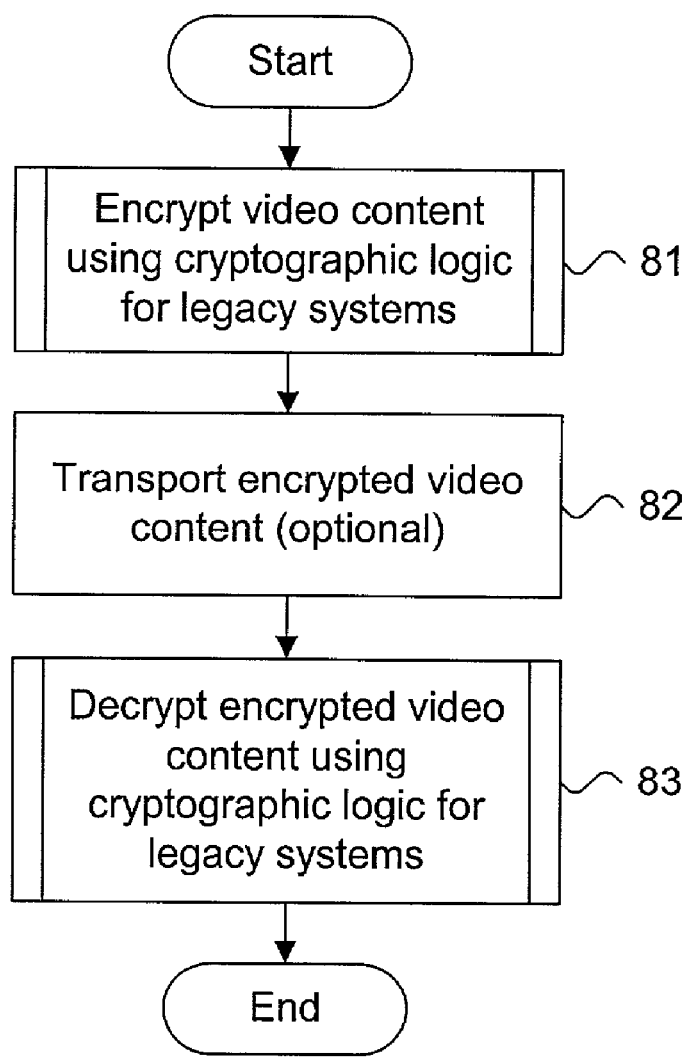
FIG. 6 is a flow diagram showing a method for automatically protecting video content using cryptographic security for legacy systems, in accordance with the present invention.

FIG. 6 is a flow diagram showing a method 80 for automatically protecting video content using cryptographic security for legacy systems, in accordance with the present invention. Raw video content 11 (shown in FIG. 1) is encrypted using crypto logic 43 (shown in FIG. 4) (block 81), as further described below with reference to FIG. 7. The encrypted video content 13 is then optionally transported (block 82) from a recording device to a playback device, such as the video camera 12 and video player 16 of FIG. 1, respectively. Finally, the encrypted video content 13 (shown in FIG. 1) is decrypted using the same crypto logic 43 (shown in FIG. 5) (block 83), as further described below with reference to FIG. 8. The method then completes.

Figure 7:
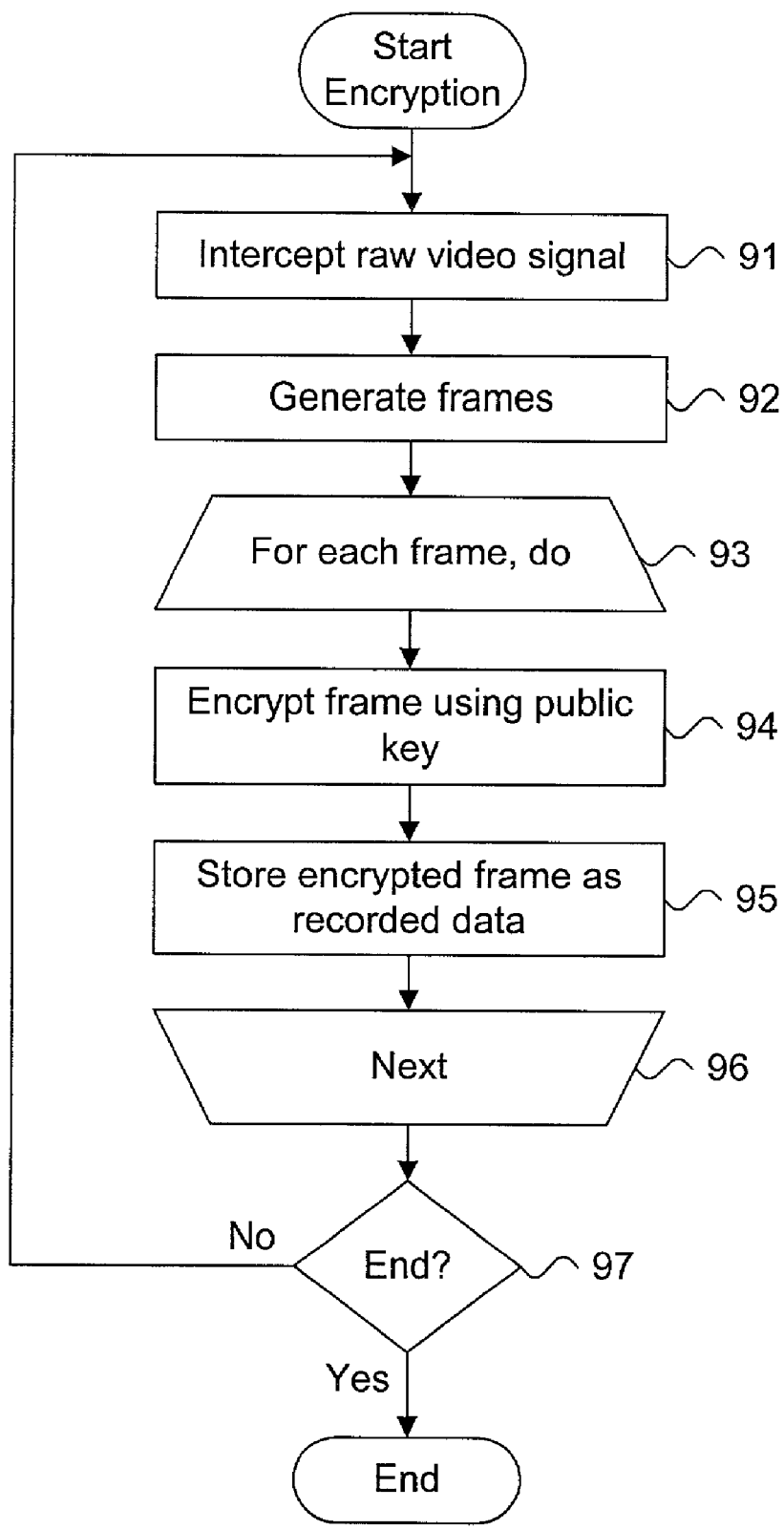
FIG. 7 is a flow diagram showing a routine for encrypting video content for use in the method of FIG. 6.

FIG. 7 is a flow diagram showing a routine 90 for encrypting video content using legacy crypto logic 43 of FIG. 4 for use in the method 80 of FIG. 6. A raw video signal 21 (shown in FIG. 2) is intercepted (block 91) prior to physical recordation on the videotape. Individual frames 26 (shown in FIG. 2) are generated (block 92) using the frame buffer 53 (shown in FIG. 4). For each of the frames 26, the following steps are performed (blocks 93–96). Each frame 26 is encrypted, preferably using a public key (block 94) to generate an encrypted frame 28 (shown in FIG. 2). Each encrypted frame 28 is then physically stored as recorded data on the videotape 48 of FIG. 4 (block 95). The foregoing steps (blocks 94–95) are repeated for each of the frames 26 (blocks 93–96). This routine is repeated until the raw video signal 21 ends (block 97), after which the routine returns.

Figure 8:
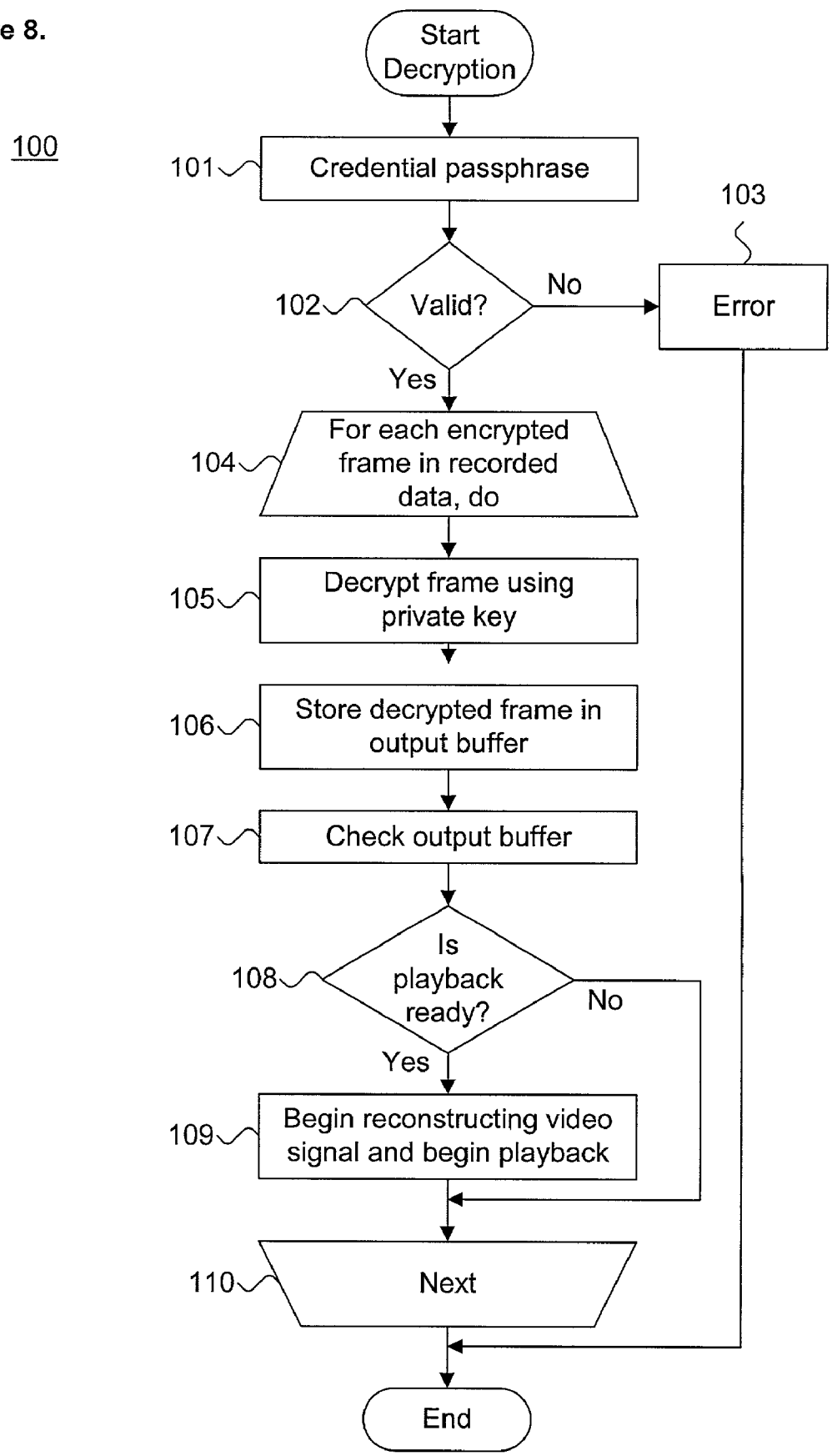
FIG. 8 is a flow diagram showing a routine for decrypting encrypted video content for use in the method of FIG. 6.

FIG. 8 is a flow diagram showing a routine 100 for decrypting the encrypted video content 13 of FIG. 1 using the crypto logic 43 of FIG. 4 for use in the method 80 of FIG. 6. The decryption key is first credentialed using a pass-phrase or password (block 101) prior to decrypting the encrypted frames 31 (shown in FIG. 3). If the pass-phrase is not valid (block 102), an error condition is generated (block 103). If the cryptographic pass-phrase or password is valid (block 102), for each of the encrypted frames 31, the following steps are performed (blocks 104–110). Each encrypted frame 31 is decrypted, preferably using a private key (block 105). Each decrypted frame 34 is then stored in the output buffer for reconstruction as video (block 106). The output buffer is checked (block 107). If the video content is ready for playback (block 108), playback begins (block 109). Otherwise, the process continues with the next encrypted frame (block 110). The foregoing steps (blocks 105–109) are repeated for each of the encrypted frames 31 (blocks 104–110). When playback begins (block 109), the decrypted frames 34 stored in the output buffer are reconstructed into a video signal 39.

Figure 9:
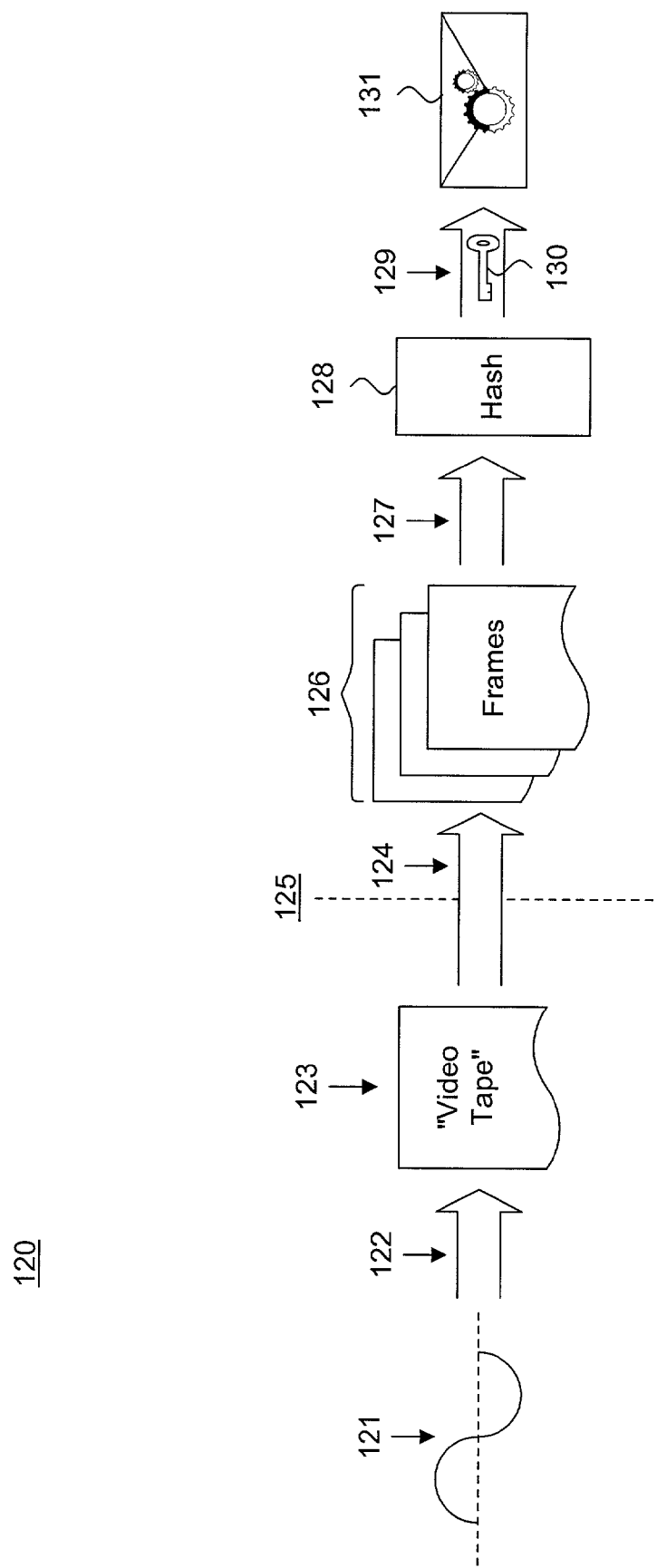
FIG. 9 is a process flow diagram showing the digital signing of the video content using the video camera of FIG. 1.

FIG. 9 is a process flow diagram showing the digital signing of video content for legacy systems using the crypto-embedded enabled video tape 14 of FIG. 1. The video content 11 (shown in FIG. 1) is represented by a substantially continuous signal 121 that is stored (transition 122) by the video camera 12 of FIG. 1 onto a "videotape" 123 as an electronic representation of the images and sounds being recorded. The cryptographic operating login incorporated into the crypto-enabled video tape 14 creates the illusion of a physical "videotape" 123 from the perspective of the video camera 12 and video player 16 (shown in FIG. 1). Internally, however, the continuous signal 121 is divided (transition 124) into discrete frames 126 of information having a fixed size. A cryptographic hash 128 is generated 126 for each frame (transition 127) and the cryptographic hash 128 is encrypted using an encryption key 130, as further described below with reference to FIG. 12, to generate a digital signature 131. The video content 11 (not shown) and digital signature 131 are then stored on the videotape 48 of FIG. 4. Note only raw video content passes the physical boundary 125 separating the video camera 12 and the crypto-embedded video tape 14 of FIG. 1. recorded (transition 129) onto a videotape 140.

Figure 10:
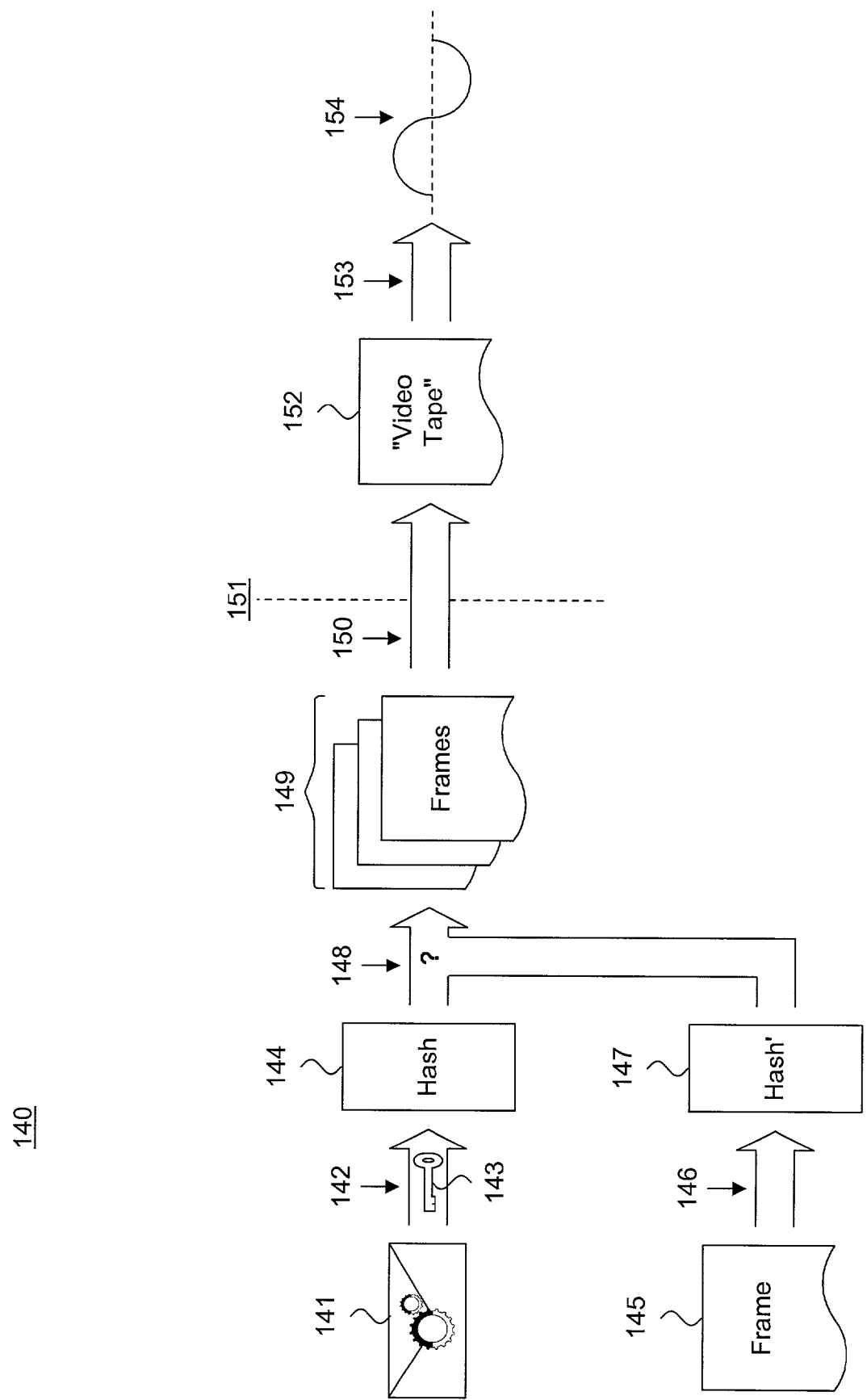
FIG. 10 is a process flow diagram showing the verification of digitally signed video content using the video player of FIG. 1.

FIG. 10 is a process flow diagram showing the verification 140 of digitally signed video content using the crypto-embedded videotape 14 of FIG. 1. The digital signature 141 is retrieved from the videotape 48 of FIG. 4 by the crypto-embedded video tape 14. The digital signature 141 is decrypted using a decryption key 143 and a cryptographic hash 144 is extracted (transition 142) from the decrypted digital signature, as further described below with reference to FIG. 13. A second cryptographic hash 147 is generated (transition 146) from the selected frame 145 of the video content 11 of FIG. 1. The cryptographic hashes are compared (transition 148) and, if matching, the frames 149 are reassembled (transition 150) into a reconstructed continuous signal 149 for viewing, processing or storage. Note only raw video content passes the physical boundary 151 separating the video player 16 and the crypto-embedded video tape 14 of FIG. 1.

Figure 11:
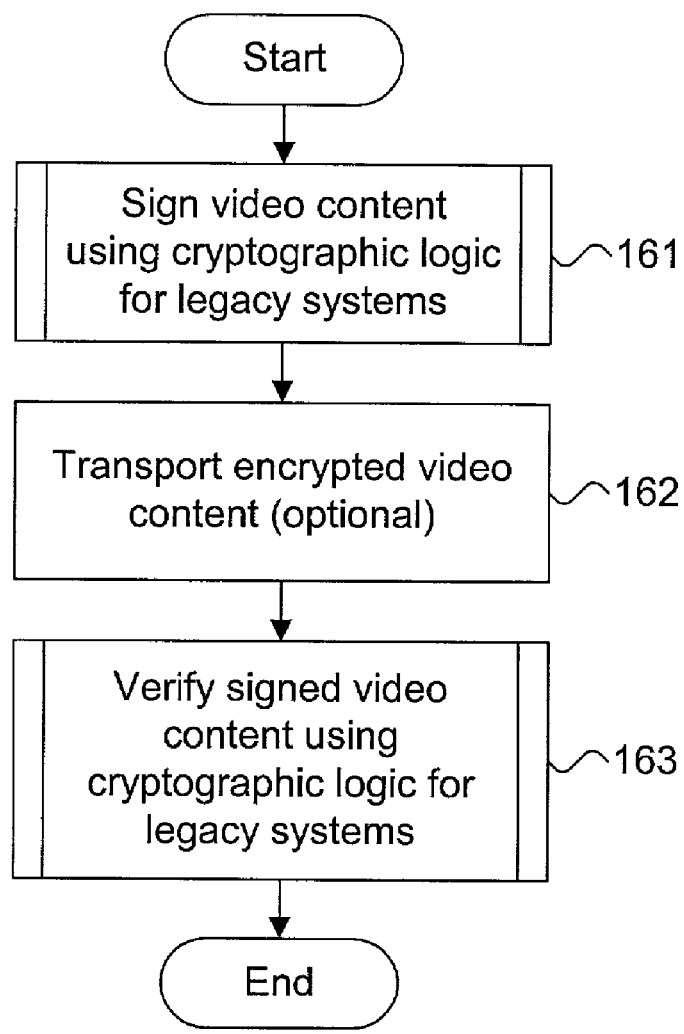
FIG. 11 is a flow diagram showing a method for automatically authenticating video content using cryptographic security for legacy systems, in accordance with the present invention.

FIG. 11 is a flow diagram showing a method 160 for automatically authenticating video content using cryptographic security for legacy systems, in accordance with the present invention. Raw video content 11 (shown in FIG. 1) is digitally signed using embedded cryptographic operating logic 43 (shown in FIG. 4) (block 161), as further described below with reference to FIG. 12. The digitally signed video content 13 is then optionally transported (block 162) from a recording device to a playback device, such as the video camera 12 and video player 16 of FIG. 1, respectively. Finally, the digitally signed video content 13 is verified using embedded cryptographic operating logic 43 (block 163), as further described below with reference to FIG. 13. The method then completes.

Figure 12:
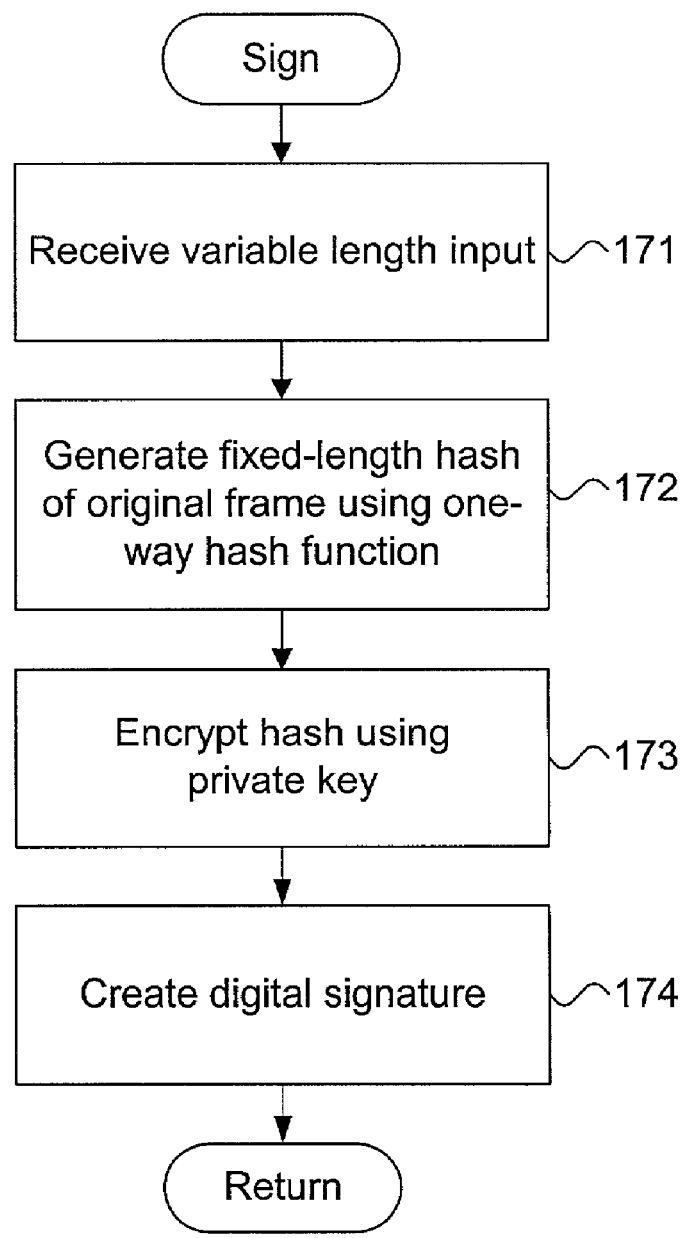
FIG. 12 is a flow diagram showing a routine for digitally signing video content for use in the method of FIG. 11.

FIG. 12 is a flow diagram showing a routine 170 for digitally signing video content for use in the method of FIG. 11. A frame having a variable length is received as input (block 171) using a frame buffer 53 (shown in FIG. 5). A fixed-length cryptographic hash 128 (shown in FIG. 9) is generated using a one-way hashing function (block 172), such as described "Introduction to Cryptography," http://www.pgpi.org/doc/guide/6.5/en/intro/, Networks Associates Technology, Inc., Santa Clara, Calif. (2001), the disclosure of which is incorporated by reference. The cryptographic hash 128 is encrypted, preferably using a private key (block 173) and a digital signature 131 (shown in FIG. 9) is created (block 174) using the encrypted cryptographic hash 128, after which the routine returns.

Figure 13:
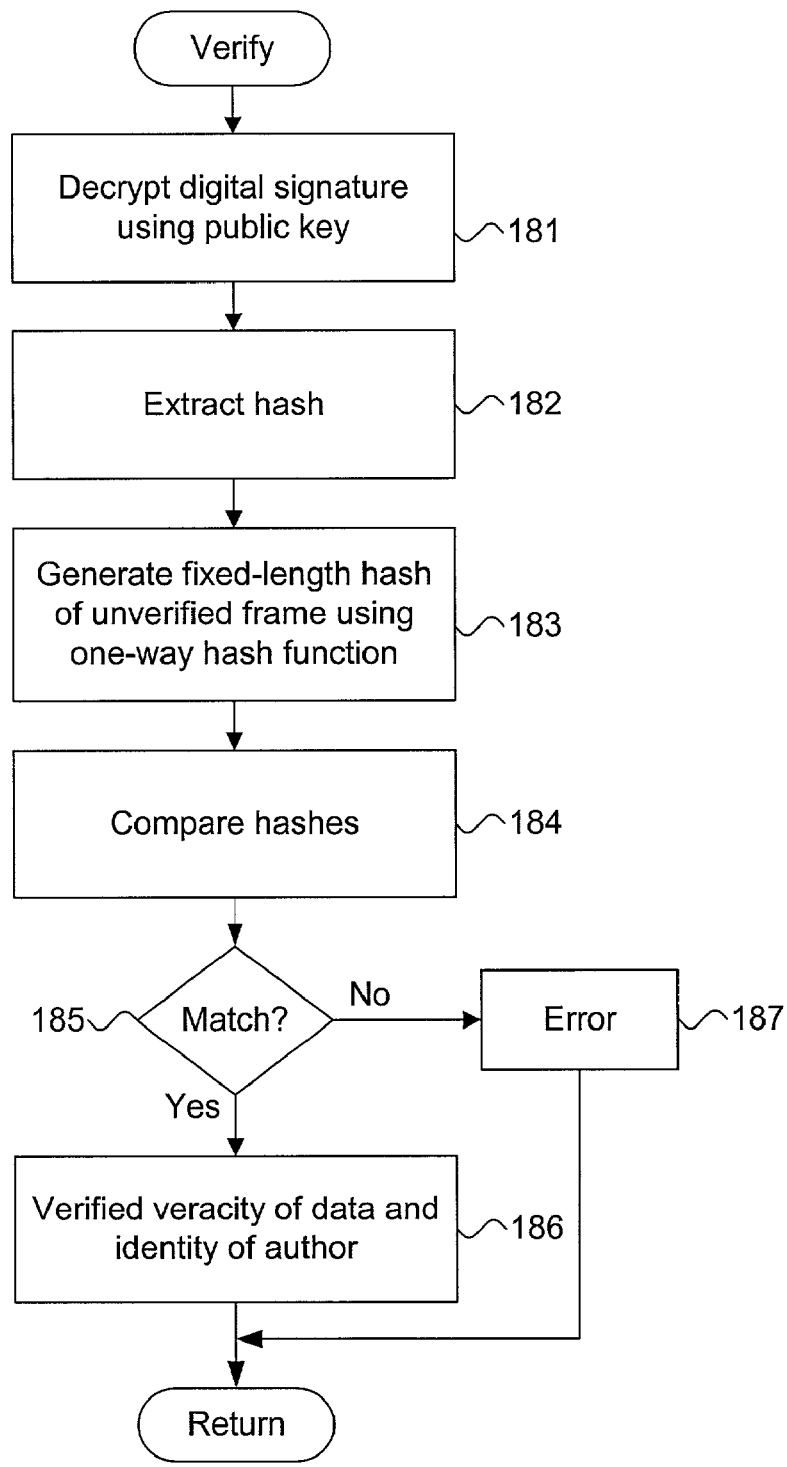
FIG. 13 is a flow diagram showing a routine for verifying digitally signed video content for use in the method of FIG. 11.

FIG. 13 is a flow diagram showing a routine 180 for verifying digitally signed video content for use in the method of FIG. 11. A digital signature 131 (shown in FIG. 9) is retrieved from digitally signed video content and decrypted, preferably using a public key (block 181). A cryptographic hash is extracted from the decrypted digital signature (block 182). A second cryptographic hash is generated from the frame selected from the digitally signed video content using the same one-way hashing function used to generate the extracted cryptographic hash (block 183). The cryptographic hashes are compared (block 185) and, if both match, the veracity of the data and identity of the author are verified (block 186). Otherwise, an error is generated (block 187) indicating possible data compromise. The routine then returns.

Figure 14:
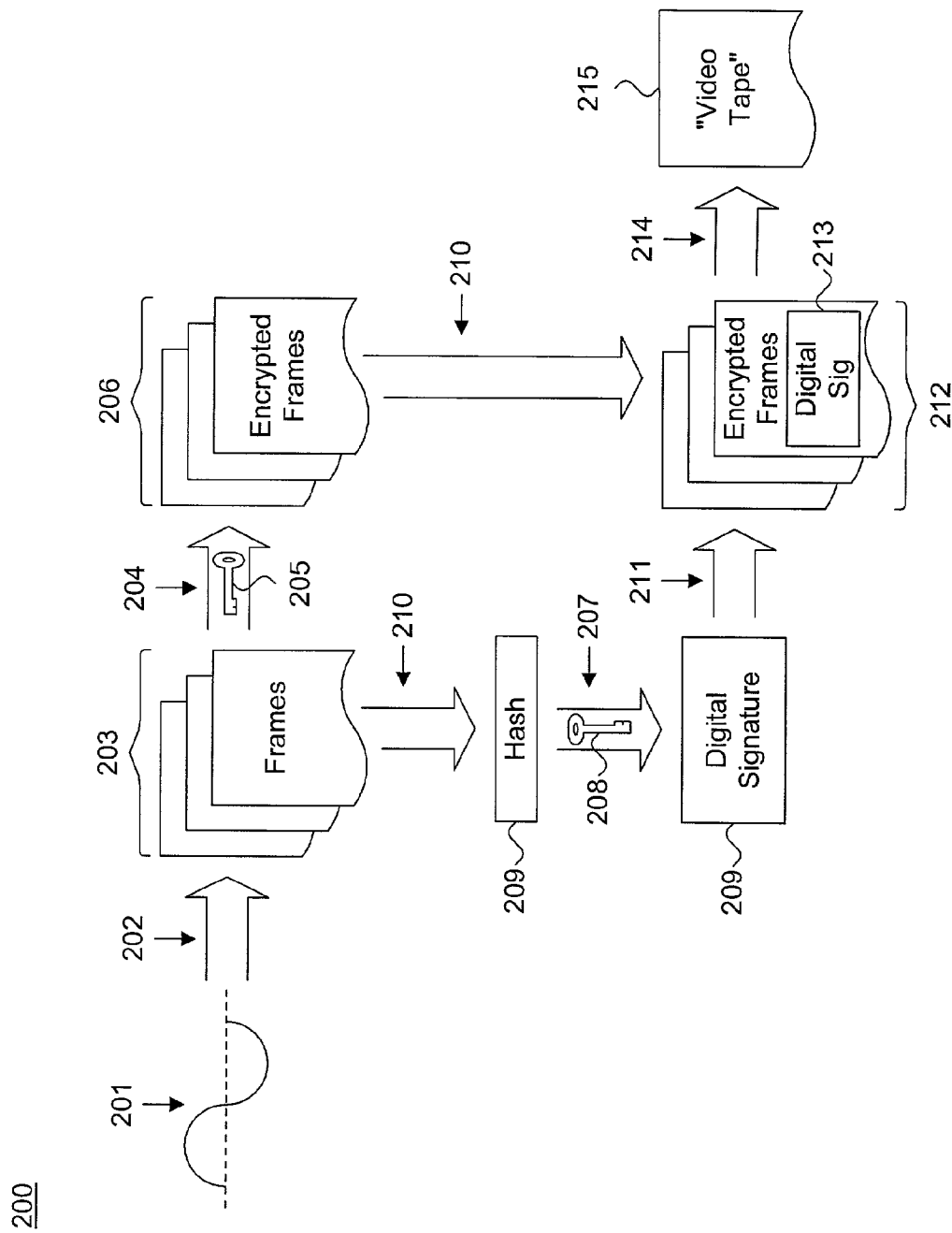
FIG. 14 is a process flow diagram showing the digital signing of encrypted video content using the video camera of FIG. 1, in accordance with a further embodiment.

FIG. 14 is a process flow diagram 200 showing the digital signing of encrypted video content using the video camera 12 of FIG. 1, in accordance with a further embodiment. The video content 11 is represented by a substantially continuous signal 201 that is converted into frames 203 having a fixed size (transition 202) by the video camera frame buffer 53. The frames are encrypted (transition 204) into encrypted frames 206 using a public cryptographic key 205. A cryptographic hash 209 is generated from selected frames 203 (transition 210). A one-way cryptographically strong hashing function is applied to each frame. The cryptographic hash is digitally signed (transition 207) to create a digital signature 209 using a private cryptographic key 208. The encrypted frames 212 and digital signature 213 are combined (transitions 210 and 211, respectively) and stored onto a "videotape" 215 (transition 214) as an electronic representation of the images and sounds being recorded.

In the described embodiment, each frame 203 is digitally signed on an individual basis. However, groups of combined frames can be signed for improved performance. For example, five frames could be signed as a single entity. Digital signatures can also be combined with encryption to optimize video content protection. Single or groups of encrypted frames can be digitally signed.

Figure 15:
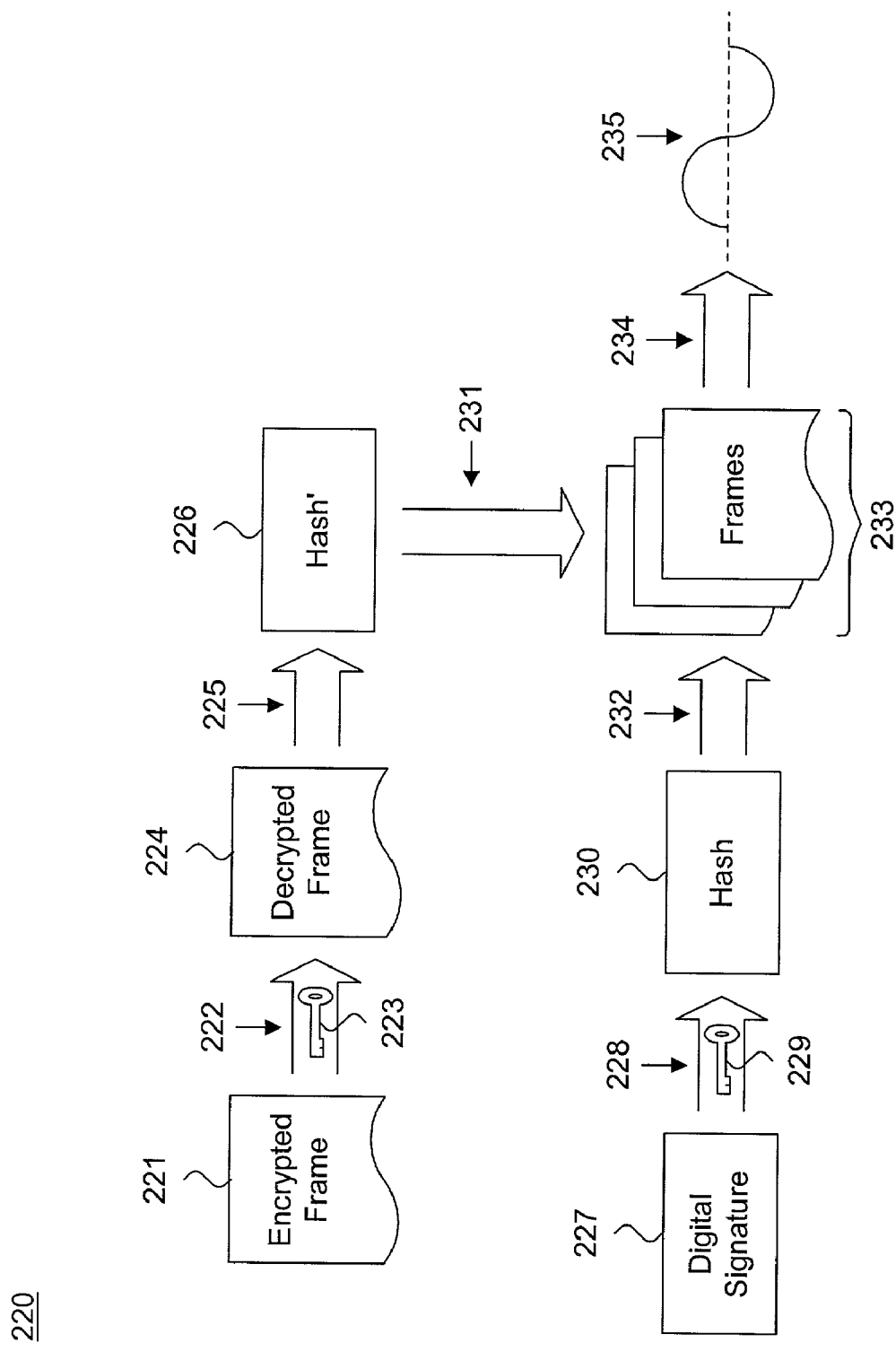
FIG. 15 is a process flow diagram showing the authentication of digital signed encrypted video content using the video player of FIG. 1, in accordance with a further embodiment.

FIG. 15 is a process flow diagram 220 showing the authentication of digital signed encrypted video content using the video player 16 of FIG. 1, in accordance with a further embodiment. Encrypted video content 13 is read from a crypto-embedded videotape 14 by the video player 16 (shown in FIG. 1). The encrypted video content 13 is retrieved as a sequence of encrypted frames (not shown) stored by the cryptographic operating logic in the crypto-embedded videotape 14 during the digital signature process 200 of FIG. 2. Each encrypted frame 221 is decrypted (transition 222) using a private cryptographic key 223 to create a decrypted frame 224. A cryptographic hash (Hash') 226 is generated from each decrypted frame 224 (transition 225). A one-way cryptographically strong hashing function is applied to each frame. As well, a digital signature 227 is authenticated (transition 228) using a public cryptographic key 229 to re-create the cryptographic hash 230 generated from the original framed video content. The two cryptographic hashes are compared and, provided the two cryptographic hashes are matching, combined into decrypted frames 233 (transitions 231 and 232). The decrypted frames 34 are reassembled (transition 234) into a "videotape" 37 for viewing, processing or storage as a continuous signal 235.

While the invention has been particularly shown and described as referenced to the embodiments thereof, those skilled in the art will understand that the foregoing and other changes in form and detail may be made therein without departing from the spirit and scope of the invention.

What is claimed is:

1. A system for automatically protecting private video content using cryptographic security for legacy systems, comprising:

a transportable storage medium, comprising:

recording logic intercepting a substantially continuous video signal representing video content in the process of being recorded on a transportable storage medium;

a frame buffer dividing the intercepted substantially continuous video signal into individual frames during recording, each individual frame storing a fixed amount of data in digital form, and combining decrypted frames into a substantially continuous video signal during playback;

a processor encrypting each individual frame into encrypted video content using an encryption cryptographic key and storing the encrypted frames during recording and retrieving the encrypted frames and decrypting each encrypted frame using a decryption cryptographic key during playback;

reading logic outputting the substantially continuous video signal as video content in the process of being played from the transportable storage medium;

a removable storage medium storing at least one of the encryption cryptographic key and the decryption cryptographic key, where the removable storage medium is removable with respect to the transportable storage medium;

an authentication module generating a fixed-length original cryptographic hash from at least one such individual frame, encrypting the original cryptographic hash using an encryption cryptographic key, storing the encrypted original cryptographic hash as a digital signature on a transportable storage medium, retrieving the digital signature from the transportable storage medium, decrypting the encrypted original cryptographic hash using a decryption cryptographic key, generating a verification fixed-length cryptographic hash from at least one such individual frame, and comparing the verification cryptographic hash and the original cryptographic hash; and a validation module validating the decryption cryptographic key against user-provided credentials prior to decrypting the encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on the transportable storage medium.

2. A system according to claim 1, further comprising:

an asymmetric cryptographic key pair comprising a private key corresponding to the encryption cryptographic key and a public key corresponding to the decryption cryptographic key.

3. A system according to claim 1, further comprising:

an asymmetric cryptographic key pair comprising a public key corresponding to the encryption cryptographic key and a private key corresponding to the decryption cryptographic key.

4. A system according to claim 3, wherein the asymmetric cryptographic key pair comprises at least one of an RSA-compatible key pair, a TwoFish-compatible key pair and a Diffie-Hellman-compatible key pair.

5. A system according to claim 1, further comprising:

a symmetric cryptographic key pair comprising a substantially identical key corresponding to each of the encryption cryptographic key and the decryption cryptographic key.

6. The system according to claim 1, wherein during the recording a first cryptographic hash is generated from at least one of the individual frames utilizing a one-way hashing function and the at least one of the individual frames is encrypted utilizing the encryption cryptographic key.

7. The system according to claim 6, wherein during the playback the first cryptographic hash is retrieved and decrypted utilizing the decryption cryptographic key.

8. The system according to claim 7, wherein a second cryptographic hash is generated from the at least one of the individual frames and compared to the decrypted first cryptographic hash.

9. The system according to claim 8, wherein the video content is played if the first cryptographic hash and the second cryptographic hash match.

10. The system according to claim 1, wherein the removable storage medium is removably coupled to a video tape cassette.

11. A method for automatically protecting private video content using cryptographic security for legacy systems, comprising:
- intercepting a substantially continuous video signal representing video content in the process of being recorded on a transportable storage medium;
- dividing the intercepted substantially continuous video signal into individual frames which each store a fixed amount of data in digital form;
- encrypting each individual frame into encrypted video content using an encryption cryptographic key and storing the encrypted frames;
- retrieving encrypted frames and decrypting each encrypted frame using a decryption cryptographic key;
- combining the decrypted frames into a substantially continuous video signal;
- outputting the substantially continuous video signal as video content in the process of being played from the transportable storage medium;
- storing at least one of the encryption cryptographic key and the decryption cryptographic key on a removable storage medium, where the removable storage medium is removable with respect to the transportable storage medium;
- generating a fixed-length original cryptographic hash from at least one such individual frame;
- encrypting the original cryptographic hash using an encryption cryptographic key and storing the encrypted original cryptographic hash as a digital signature on a transportable storage medium;
- retrieving the digital signature from the transportable storage medium and decrypting the encrypted original cryptographic hash using a decryption cryptographic key;
- generating a verification fixed-length cryptographic hash from at least one such individual frame and comparing the verification cryptographic hash and the original cryptographic hash;
- outputting the substantially continuous video signal upon successful comparison of the verification cryptographic hash and the original cryptographic hash; and
- validating the decryption cryptographic key against user-provided credentials prior to decrypting the encrypted frames;
- wherein the removable storage medium includes memory that is coupled to a standardized connector which enables utilization of at least one of a plurality of encryption cryptographic keys and a plurality of decryption cryptographic keys;
- wherein a set of cryptographic instructions is stored on the removable storage medium for employing at least one of the encryption cryptographic key and the decryption cryptographic key;
- wherein the removable storage medium comprises only the memory and is separate from a player which is capable of playing the video content on the transportable storage medium.

12. A method according to claim 11, further comprising:
providing an asymmetric cryptographic key pair comprising a private key corresponding to the encryption cryptographic key and a public key corresponding to the decryption cryptographic key.

13. A method according to claim 11, further comprising:
providing an asymmetric cryptographic key pair comprising a public key corresponding to the encryption cryptographic key and a private key corresponding to the decryption cryptographic key.

14. A method according to claim 13, wherein the asymmetric cryptographic key pair comprises at least one of an RSA-compatible key pair, a TwoFish-compatible key pair and a Diffie-Hellman-compatible key pair.

15. A method according to claim 11, further comprising:
providing a symmetric cryptographic key pair comprising a substantially identical key corresponding to each of the encryption cryptographic key and the decryption cryptographic key.

16. A computer-readable storage medium holding code for performing the method according to claims 11, 12, 13, or 15.

17. A system for encrypting private video content using cryptographic security for legacy systems, comprising:
- recordation logic intercepting a substantially continuous video signal prior to recordation on a transportable storage medium, the signal representing raw video content;
- a frame buffer dividing the signal into individual frames which each store a fixed amount of data in digital form;
- a processor encrypting each individual frame into encrypted video content using an encryption key selected from a cryptographic key pair and storing the encrypted frames on the transportable storage medium for retrieval and decryption using a decryption key selected from the cryptographic key pair, the processor generating a fixed-length original cryptographic hash from at least one such individual frame, encrypting the original cryptographic hash using an encryption cryptographic key from a cryptographic key pair, and storing the encrypted original cryptographic hash as a digital signature on the transportable storage medium for retrieval and decryption using a decryption key selected from the cryptographic key pair,
- a removable storage medium storing at least one of the encryption key and the decryption key, where the removable storage medium is removable with respect to the transportable storage medium; and
- a validation module validating the decryption key against user-provided credentials prior to decrypting the encrypted frames;
- wherein the removable storage medium includes memory that is coupled to a standardized connector which enables utilization of at least one of a plurality of encryption keys and a plurality of decryption keys;
- wherein a set of cryptographic instructions is stored on the removable storage medium for employing at least one of the encryption cryptographic key and the decryption key;
- wherein the removable storage medium comprises only the memory and is separate from a player which is capable of playing the video content on the transportable storage medium.

18. A system according to claim 17, further comprising:
a private key corresponding to the encryption cryptographic key and a public key corresponding to the decryption cryptographic key.

19. A system according to claim 17, further comprising:
a public key corresponding to the encryption cryptographic key and a private key corresponding to the decryption cryptographic key.

20. A system according to claim 17, further comprising:
a substantially identical key corresponding to each of the encryption cryptographic key and the decryption cryptographic key.

21. A method for encrypting private video content using cryptographic security for legacy systems, comprising:
intercepting a substantially continuous video signal prior to recordation on a transportable storage medium, the signal representing raw video content, and dividing the signal into individual frames which each store a fixed amount of data in digital form;
encrypting each individual frame into encrypted video content using an encryption key selected from a cryptographic key pair;
storing the encrypted frames on the transportable storage medium for retrieval and decryption using a decryption key selected from the cryptographic key pair;
storing at least one of the encryption key and the decryption key on a removable storage medium, where the removable storage medium is removable with respect to the transportable storage medium;
generating a fixed-length original cryptographic hash from at least one such individual frame;
encrypting the original cryptographic hash using an encryption cryptographic key from a cryptographic key pair;
storing the encrypted original cryptographic hash as a digital signature on the transportable storage medium for retrieval and decryption using a decryption key selected from the cryptographic key pair; and
validating the decryption key against user-provided credentials prior to decrypting the encrypted frames;
wherein the removable storage medium includes memory that is coupled to a standardized connector which enables utilization of at least one of a plurality of encryption cryptographic keys and a plurality of decryption keys;
wherein a set of cryptographic instructions is stored on the removable storage medium for employing at least one of the encryption cryptographic key and the decryption key;
wherein the removable storage medium comprises only the memory and is separate from a player which is capable of playing the video content on the transportable storage medium.

22. A method according to claim 21, further comprising:
employing a private key corresponding to the encryption cryptographic key and a public key corresponding to the decryption cryptographic key.

23. A method according to claim 21, further comprising:
employing a public key corresponding to the encryption cryptographic key and a private key corresponding to the decryption cryptographic key.

24. A method according to claim 21, further comprising:
employing a substantially identical key corresponding to each of the encryption cryptographic key and the decryption cryptographic key.

25. A computer-readable storage medium holding code for performing the method according to claims 21, 22, 23 or 24.

26. A system for decrypting private video content using cryptographic security for legacy systems, comprising:
reading logic retrieving encrypted frames prior to playback from a transportable storage medium, the encrypted frames storing raw video content encrypted using an encryption cryptographic key selected from a cryptographic key pair;
a processor decrypting each encrypted frame using a decryption cryptographic key selected from the cryptographic key pair;
a frame buffer combining the decrypted frames into a substantially continuous video signal representing the raw video content in reconstructed form; and
a removable storage medium storing at least one of the encryption cryptographic key and the decryption cryptographic key, where the removable storage medium is removable with respect to the transportable storage medium;
the reading logic retrieving a digital signature included with the encrypted frames and encrypted using an encryption cryptographic key selected from a cryptographic key pair;
the processor generating a verification fixed-length cryptographic hash from at least one such individual frame and comparing the verification cryptographic hash and the original cryptographic hash;
the frame buffer combining the individual frames into a substantially continuous video signal and outputting the substantially continuous video signal as video content in the process of being played from the transportable storage medium upon successful comparison of the verification cryptographic hash and the original cryptographic hash; and
a validation module validating the decryption cryptographic key against user-provided credentials prior to decrypting the encrypted frames;
wherein the removable storage medium includes memory that is coupled to a standardized connector which enables utilization of at least one of a plurality of encryption cryptographic keys and a plurality of decryption cryptographic keys;
wherein a set of cryptographic instructions is stored on the removable storage medium for employing at least one of the encryption cryptographic key and the decryption cryptographic key;
wherein the removable storage medium comprises only the memory and is separate from a player which is capable of playing the video content on the transportable storage medium.

27. A system according to claim 26, further comprising:
a public key corresponding to the encryption cryptographic key and a private key corresponding to the decryption cryptographic key.

28. A system according to claim 26, further comprising:
a substantially identical key corresponding to each of the encryption cryptographic key and the decryption cryptographic key.

29. A method for decrypting private video content using cryptographic security for legacy systems, comprising:
retrieving encrypted frames prior to playback from a transportable storage medium, the encrypted frames storing raw video content encrypted using an encryption cryptographic key selected from a cryptographic key pair;
decrypting each encrypted frame using a decryption cryptographic key selected from the cryptographic key pair;
combining the decrypted frames into a substantially continuous video signal representing the raw video content in reconstructed form;
storing at least one of the encryption cryptographic key and the decryption cryptographic key on a removable storage medium, where the removable storage medium is removable with respect to the transportable storage medium;

retrieving a digital signature included with the encrypted frames and encrypted using an encryption cryptographic key selected from a cryptographic key pair;

generating a verification fixed-length cryptographic hash from at least one such individual frame and comparing the verification cryptographic hash and the original cryptographic hash;

combining the individual frames into a substantially continuous video signal and outputting the substantially continuous video signal as video content in the process of being played from the transportable storage medium upon successful comparison of the verification cryptographic hash and the original cryptographic hash; and validating the decryption cryptographic key against user-provided credentials prior to decrypting the encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on transportable storage medium.

30. A method according to claim 29, further comprising: employing a public key corresponding to the encryption cryptographic key and a private key corresponding to the decryption cryptographic key.

31. A method according to claim 29, further comprising: employing a substantially identical key corresponding to each of the encryption cryptographic key and the decryption cryptographic key.

32. A computer-readable storage medium holding code for performing the method according to claims 29, 30 or 31.

33. A method for automatically authenticating private video content using cryptographic security for legacy systems, comprising:

a transportable storage medium, comprising:

recording logic intercepting a substantially continuous video signal representing video content in the process of being recorded on a transportable storage medium;

a frame buffer dividing a substantially continuous video signal representing raw video content into individual frames which each store a fixed amount of data in digital form and combining the individual frames into a substantially continuous video signal;

a processor generating a fixed-length original cryptographic hash from at least one such individual frame, encrypting the original cryptographic hash using an encryption cryptographic key, storing the encrypted original cryptographic hash as a digital signature on a transportable storage medium, retrieving the digital signature from the transportable storage medium, decrypting the encrypted original cryptographic hash using a decryption cryptographic key, generating a verification fixed-length cryptographic hash from at least one such individual frame, and comparing the verification cryptographic hash and the original cryptographic hash;

reading logic outputting the substantially continuous video signal as video content in the process of being played from the transportable storage medium upon successful comparison of the verification cryptographic hash and the original cryptographic hash;

a removable storage medium storing at least one of the encryption cryptographic key and the decryption cryptographic key, where the removable storage medium is removable with respect to the transportable storage medium; and a validation module validating the decryption cryptographic key against user-provided credentials prior to decrypting encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on the transportable storage medium.

34. A method for automatically authenticating private video content using cryptographic security for legacy systems, comprising:

intercepting a substantially continuous video signal representing video content in the process of being recorded on a transportable storage medium;

dividing a substantially continuous video signal representing raw video content into individual frames which each store a fixed amount of data in digital form;

generating a fixed-length original cryptographic hash from at least one such individual frame;

encrypting the original cryptographic hash using an encryption cryptographic key and storing the encrypted original cryptographic hash as a digital signature on a transportable storage medium;

retrieving the digital signature from the transportable storage medium and decrypting the encrypted original cryptographic hash using a decryption cryptographic key;

generating a verification fixed-length cryptographic hash from at least one such individual frame and comparing the verification cryptographic hash and the original cryptographic hash;

combining the individual frames into a substantially continuous video signal and outputting the substantially continuous video signal as video content in the process of being played from the transportable storage medium upon successful comparison of the verification cryptographic hash and the original cryptographic hash;

storing at least one of the encryption cryptographic key and the decryption cryptographic key on a removable storage medium, where the removable storage medium is removable with respect to the transportable storage medium; and validating the decryption cryptographic key against user-provided credentials prior to decrypting encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on the transportable storage medium.

35. A computer-readable storage medium holding code for performing the method according to claim 34.

36. A system for digitally signing private video content using cryptographic security for legacy systems, comprising:

recordation logic intercepting a substantially continuous video signal prior to recordation on a transportable storage medium, the signal representing raw video content;

a frame buffer dividing the signal into individual frames which each store a fixed amount of data in digital form;

a processor generating a fixed-length original cryptographic hash from at least one such individual frame, encrypting the original cryptographic hash using an encryption cryptographic key from a cryptographic key pair, and storing the encrypted original cryptographic bash as a digital signature on a transportable storage medium for retrieval and decryption using a decryption key selected from the cryptographic key pair;

providing at least one of the encryption cryptographic key and the decryption cryptographic key on a removable storage medium, where the removable storage medium is removable with respect to the transportable storage medium; and a validation module validating the decryption cryptographic key against user-provided credentials prior to decrypting encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on the transportable storage medium.

37. A system according to claim 36, further comprising:

employing a substantially identical key corresponding to each of the encryption cryptographic key and the decryption cryptographic key.

38. A method for digitally signing private video content using cryptographic security for legacy systems, comprising:

intercepting a substantially continuous video signal prior to recordation on a transportable storage medium, the signal representing raw video content;

dividing the signal into individual frames which each store a fixed amount of data in digital form;

generating a fixed-length original cryptographic hash from at least one such individual frame;

encrypting the original cryptographic hash using an encryption cryptographic key from a cryptographic key pair;

storing the encrypted original cryptographic hash as a digital signature on a transportable storage medium for retrieval and decryption using a decryption key selected from the cryptographic key pair;

storing at least one of the encryption cryptographic key and the decryption key on a removable storage medium, where the removable storage medium is removable with respect to the transportable storage medium; and validating the decryption key against user-provided credentials prior to decrypting encrypted frames;

wherein the removable storage medium includes memory that is coupled to a standardized connector which enables utilization of at least one of a plurality of encryption cryptographic keys and a plurality of decryption keys;

wherein a set of cryptographic instructions is stored on the removable storage medium for employing at least one of the encryption cryptographic key and the decryption key;

wherein the removable storage medium comprises only the memory and is separate from a slayer which is capable of playing the video content on the transportable storage medium.

39. A method according to claim 38, further comprising;

employing a substantially identical key corresponding to each of the encryption cryptographic key and the decryption cryptographic key.

40. A computer-readable storage medium holding code for performing the method according to claims 38 or 39.

41. A system for verifying digitally signed private video content using cryptographic security for legacy systems, comprising:

reading logic retrieving frames prior to playback from a transportable storage medium, the frames storing raw video content and including a digital signature encrypted using an encryption cryptographic key selected from a cryptographic key pair;

a processor generating a verification fixed-length cryptographic hash from at least one such individual frame and comparing the verification cryptographic hash and the original cryptographic hash;

a frame buffer combining the individual frames into a substantially continuous video signal and outputting the substantially continuous video signal as video content in the process of being played from the transportable storage medium upon successful comparison of the verification cryptographic hash and the original cryptographic hash;

a removable storage medium storing the encryption cryptographic key, where the removable storage medium is removable with respect to the transportable storage medium; and a validation module validating a decryption cryptographic key against user-provided credentials prior to decrypting encrypted frames;

wherein the removable storage medium includes memory that is coupled to a standardized connector which enables utilization of at least one of a plurality of encryption cryptographic keys and a plurality of decryption cryptographic keys;

wherein a set of cryptographic instructions is stored on the removable storage medium for employing at least one of the encryption cryptographic key and the decryption cryptographic key;

wherein the removable storage medium comprises only the memory and is separate from a player which is capable of playing the video content on the transportable storage medium.

42. A method for verifying digitally signed private video content using cryptographic security for legacy systems, comprising:
- retrieving frames prior to playback from a transportable storage medium, the frames storing raw video content and including a digital signature encrypted using an encryption cryptographic key selected from a cryptographic key pair;
- generating a verification fixed-length cryptographic hash from at least one such individual frame and comparing the verification cryptographic hash and the original cryptographic hash;
- combining the individual frames into a substantially continuous video signal and outputting the substantially continuous video signal as video content in the process of being played from the transportable storage medium upon successful comparison of the verification cryptographic hash and the original cryptographic hash;
- storing the encryption cryptographic key on a removable storage medium, where the removable storage medium is removable with respect to the transportable storage medium; and
- validating a decryption cryptographic key against user-provided credentials prior to decrypting encrypted frames;
- wherein the removable storage medium includes memory that is coupled to a standardized connector which enables utilization of at least one of a plurality of encryption cryptographic keys and a plurality of decryption cryptographic keys;
- wherein a set of cryptographic instructions is stored on the removable storage medium for employing at least one of the encryption cryptographic key and the decryption cryptographic key;
- wherein the removable storage medium comprises only the memory and is separate from a player which is capable of playing the video content on the transportable storage medium.

43. A computer-readable storage medium holding code for performing the method according to claim 42.

* * * * *

UNITED STATES PATENT AND TRADEMARK OFFICE
CERTIFICATE OF CORRECTION

PATENT NO. : 7,120,252 B1 Page 1 of 1
APPLICATION NO. : 09/931794
DATED : October 10, 2006
INVENTOR(S) : Jones et al.

It is certified that error appears in the above-identified patent and that said Letters Patent is hereby corrected as shown below:

In the claims:
col. 14, line 40 replace "pair," with --pair;--;
col. 16, line 53 replace "a" with --the--;
col. 19, line 25 replace "bash" with --hash--;
col. 20, line 20 replace "slayer" with --player--;
col. 20, line 22 replace "comprising;" with --comprising:--.

Signed and Sealed this

Sixteenth Day of February, 2010

David J. Kappos
*Director of the United States Patent and Trademark Office*